May 22, 1962 C. R. HANNA 3,035,852
VEHICLE STABILIZER, TILTER AND LEVELING SYSTEM
Filed Nov. 21, 1958 4 Sheets-Sheet 1

Fig. I.

WITNESSES

INVENTOR
Clinton R. Hanna
BY
ATTORNEY

May 22, 1962   C. R. HANNA   3,035,852
VEHICLE STABILIZER, TILTER AND LEVELING SYSTEM
Filed Nov. 21, 1958   4 Sheets-Sheet 2

# United States Patent Office 3,035,852
Patented May 22, 1962

3,035,852
VEHICLE STABILIZER, TILTER AND LEVELING SYSTEM
Clinton R. Hanna, Pittsburgh, Pa., assignor to Westinghouse Electric Corporation, East Pittsburgh, Pa., a corporation of Pennsylvania
Filed Nov. 21, 1958, Ser. No. 775,430
15 Claims. (Cl. 280—124)

This invention relates to a vehicle stabilizer, tilter and leveling means, and more particularly to a vehicle power shock absorber device having a sensing means for stabilizing, tilting and leveling a vehicle sprung mass upon the sensing of vertical and lateral accelerations as well as change in vertical load.

In present day conventional land vehicles, shock absorbing devices located between the sprung mass or body of the vehicle and the unsprung mass (usually comprising vehicle wheels and axles) are of the passive type. This type of shock absorbing device provides reasonably satisfactory vehicle sprung mass vibration amplitude attenuation when the frequency of the unsprung mass movement is above the natural resonant frequency of the sprung mass. However, when the frequency of the unsprung mass movement is approximately the same as the natural resonant frequency of the sprung mass, the passive shock absorber provides an inadequate means of preventing large sprung mass movements.

It is also common, with the use of passive shock absorbers, for present day vehicles to respond to lateral accelerations during a vehicle turn in a manner causing the sprung mass of the vehicle to lean outwardly from the center of the turn. Since the sprung mass is usually located above its roll axis, it can be seen that movement of the sprung mass away from the center of the turn tends to cause the center gravity of the sprung mass to act in a direction to cause over-turning of the vehicle.

It is therefore an object of this invention to present a vehicle stabilizer capable of providing a means of tilting the vehicle in a direction toward the center of any turn being made by the vehicle as well as providing ride stabilization and load leveling control.

It is another object of this invention to provide a pressure relationship between the reservoir and supply pressures for the purpose of maintaining adequate control without cavitation.

It is another object of this invention to provide two main pressure systems for each stabilizer, one of which is varied to provide vehicle leveling in response to changes in loads.

It is another object of this invention to provide fluid flow control between the two pressure systems capable of preventing too rapid a rate of flow between said systems during fluid transfer periods to prevent power shock absorber response to rapid changes in conditions of the leveling control for the vehicle.

It is another object of this invention to provide a ratio control for maintaining a minimum pressure ratio between one of said pressure systems and the other of said systems.

It is another object of this invention to provide a single unit sensing and valve control member.

It is another object of this invention to provide supply and exhaust valves with separate fluid actuator supply areas and valve control sensing areas.

It is an additional object of this invention to provide sensing mass damping capable of automatic adjustment in response to temperature changes.

It is another object of this invention to provide velocity control of fluid transfer to and from the leveling accumulator regardless of pressure.

Other objects, purposes and characteristic features will become obvious as the description of the invention progresses.

It is a practice of this invention to provide stabilizing or shock absorbing means between sprung and unsprung masses at times when the unsprung mass is traversing uneven terrain. In the present invention this is accomplished through the use of a plurality of power shock absorbers connected between the sprung and unsprung masses. Each power shock absorber is provided with an acceleration sensing and control means capable of responding to vertical and lateral accelerations in such a way as to cause the sprung mass to appear as a very large equivalent mass. The sensing and control device of each shock absorber is mounted on the sprung mass and by responding to any acceleration of the sprung mass, either in the vertical or lateral direction, is capable of causing the power shock absorber to rapidly reduce the magnitude of the sprung mass accelerations. The power shock absorbing sensing devices are positioned on the sprung mass in a manner capable of detecting vehicle sprung mass lateral accelerations in response to a turn, and in response to such lateral accelerations causing the power shock absorbers to tilt the sprung mass toward the center of the vehicle turn circle. The resulting tilt action is continued until the vehicle sprung mass lateral accelerations have become neutralized, at which time the sensing device acts to maintain proper tilt and also to control vertical accelerations due to terrain unevenness.

The present invention also includes a vehicle leveling means utilizing a position controller for maintaining the relative spaced apart positions of the sprung and unsprung masses during a change in vehicle load. The position controller utilized for maintaining the relative spaced apart positions of the sprung and unsprung masses provides a means for varying the pressure in one pressure system to maintain the vehicle level during periods of load changes. With this arrangement the response of the main pressure system is not reduced during vehicle stabilization control.

In each of the several views similar parts are designated by similar reference characters.

The present invention is similar to and is an improvement over the power shock absorber system disclosed in applicant's copending application, Serial No. 630,835, entitled "Vehicle Stabilizer, Tilter and Leveling Means," filed December 27, 1956, now Patent No. 2,976,052, dated Mar. 21, 1961, and assigned to the common assignee.

Figure 1:
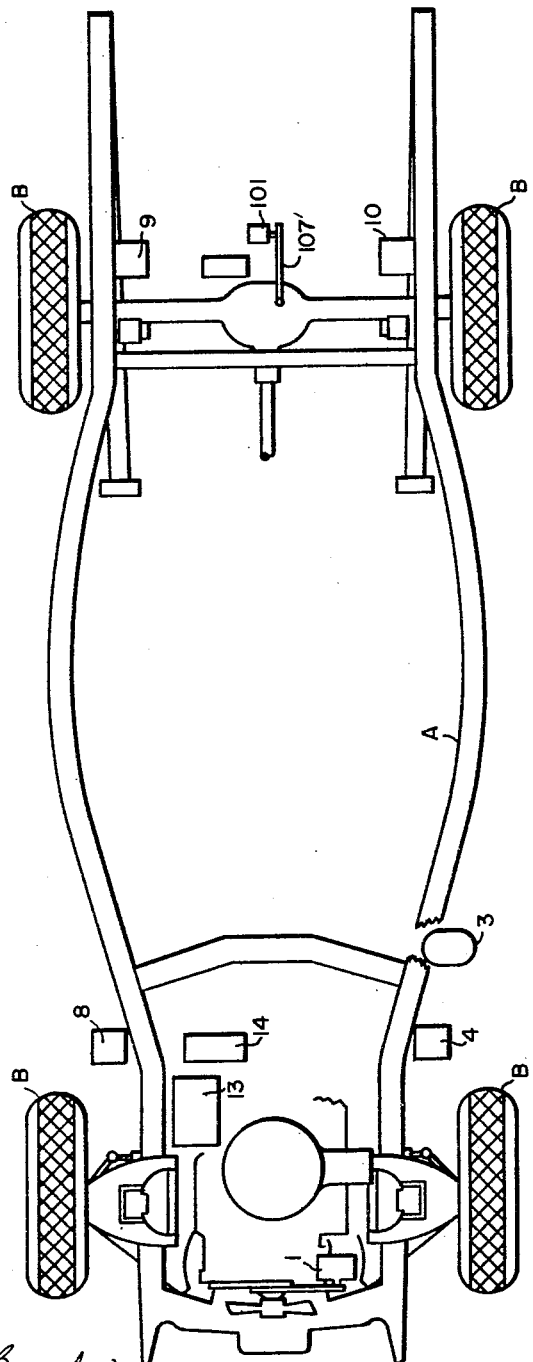
FIG. 1 is a plan view of a typical vehicle frame and undercarriage showing the relative positions of the major components of the system.
Figure 2:
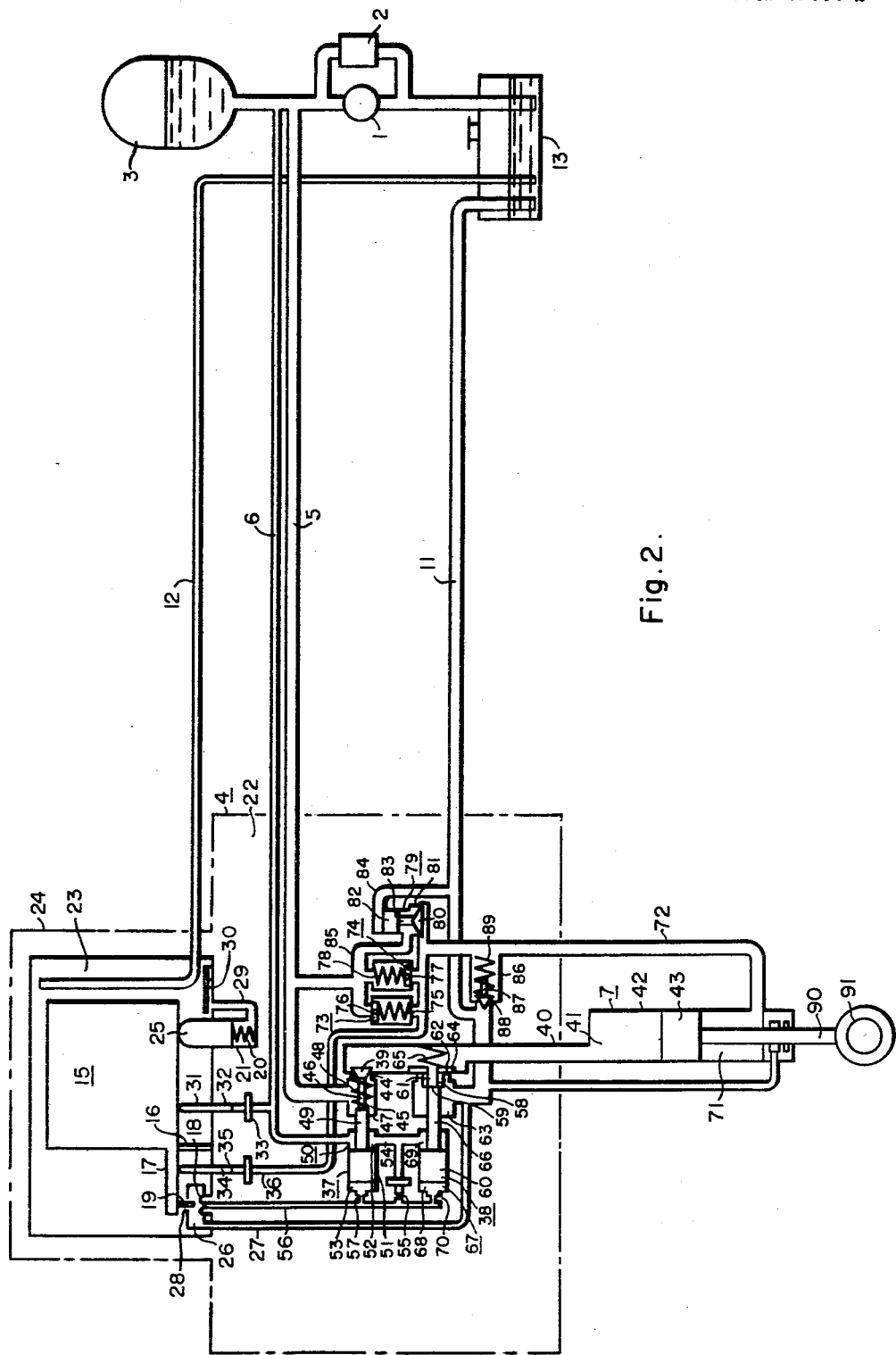
FIG. 2 is a diagrammatic showing of one embodiment of a stabilizer control utilizing the present invention.

In order to provide an adequate understanding of the position of the major elements such as shown in FIG. 1 a typical embodiment such as shown in FIG. 2 will be explained with reference to the location of its parts in FIG. 1. The embodiment shown in FIG. 2 includes a main pump 1 capable of supplying fluid under pressure at a suitable pressure level. The pump 1, as shown in FIG. 2, is capable of supplying fluid to all of the actuator or power shock absorber units shown in FIG. 1. In each embodiment, however, the pump is shown as supplying only a single shock absorber element. The pump 1 is provided with an unloader valve 2 capable of maintaining the desired pressure level in the accumulator 3 at all times. The unloader valve 2 allows fluid passage when the desired maximum pressure is reached in the accumulator 3. Thus, the accumulator is a pressure reference whose reference level is set by the unloading valve 2. The accumulator 3 is connected to the sensing and control valve unit 4 through a pair of supply pipes 5 and 6. The supply pipe 5 is the main fluid supply to the associated actuator 7 through suitable control valves to be explained hereinafter. The pressure supply pipe 6 is a pilot supply pipe used for the control of the supply valves utilized in controlling the position of the actuator 7, as will be explained hereinafter.

The main accumulator 3 is shown positioned on the left-hand side of the vehicle and is adequate for maintaining pressure supply to each of the shock absorbers located adjacent to each of the wheels. The sensing and valve unit 4 shown in FIG. 2 is a typical sensing and valve unit of the four, as 4, 8, 9, and 10, shown in FIG. 1, and for the sake of description is selected as being the left-hand front sensing valve unit shown in FIG. 1. However, the remaining sensing and valve units 8, 9 and 10 are identical to the unit 4, except for the position on the frame and therefore will not be described in detail.

Each of the sensing and valve units, such as the unit 4, is provided with flow return pipes 11 and 12 leading from the unit 4 to a suitable reservoir 13 utilized to provide a supply of fluid for the pressure pump 1. Since the energy absorbed by the shock absorbers must eventually result in heating of the system, it may be desirable to provide a heat exchanger shown in block form as the member 14 in FIG. 1. The heat exchanger is arranged to extract heat from the fluid, as oil, in the reservoir to provide a cool supply of fluid to the pump 1.

Figure 4:
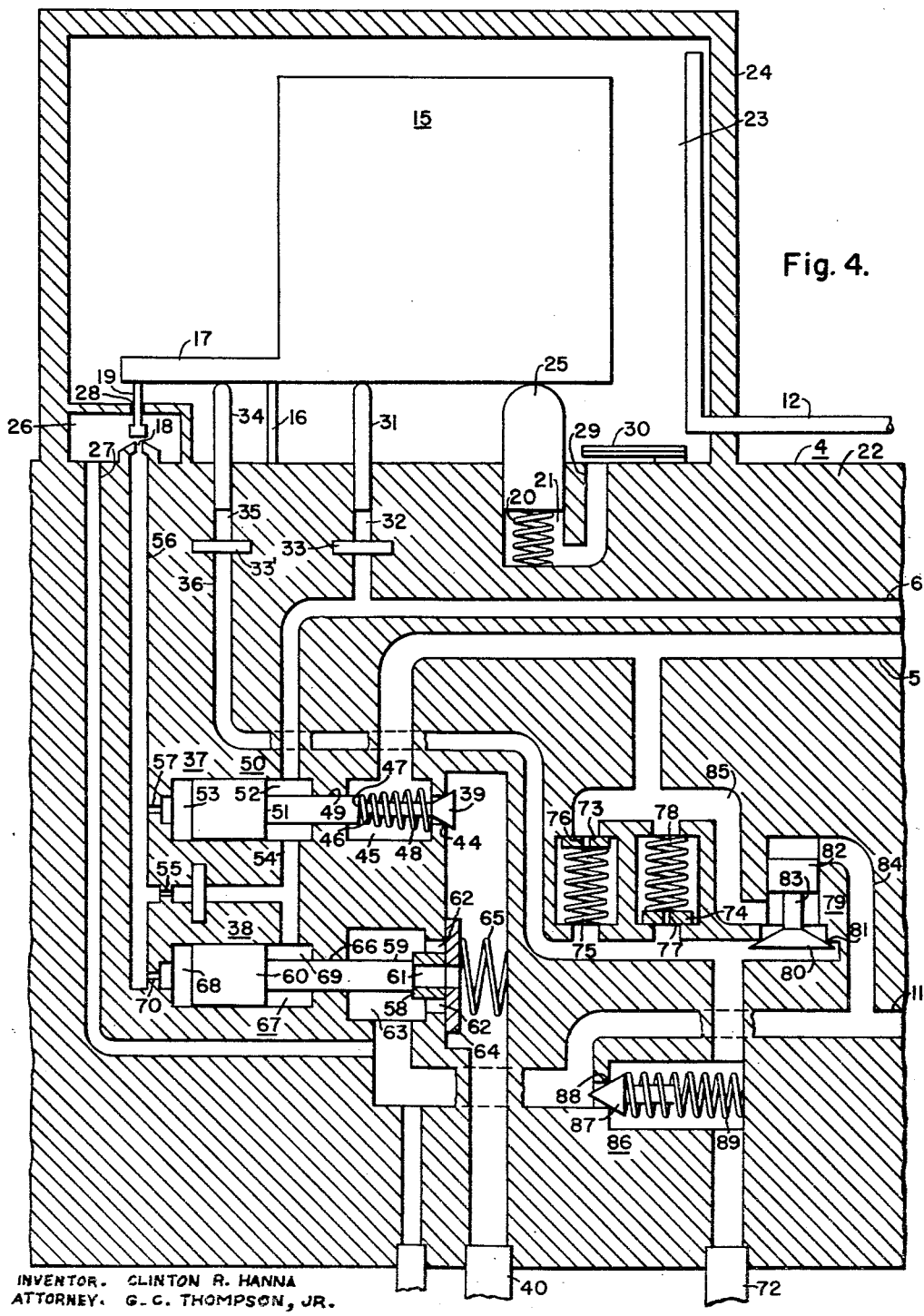
FIG. 4 is a showing, somewhat diagrammatic and on a larger scale, of the sprung mass movement sensing and control means.

A detailed description of the sensing and valve unit 4 will now be provided. In order to provide acceleration sensing, a suitable sensing mass or member 15 is supported for pivotal movement at a point displaced both horizontally and vertically from its center of gravity, or preferably to one side and below its center of gravity, by a suitable flexible member such as a leaf spring 16, as shown in more detail in FIG. 4. The sensing member is provided with a control arm 17 attached to and extending outwardly in a direction opposite from the hinge leaf spring 16 for the purpose of controlling fluid flow through a suitable pilot orifice 18. The orifice 18 is used to control the supply and exhaust valves in a manner to be explained hereinafter. The arm 17 is provided with a valve 19 positioned to cooperate with the opening or orifice 18 for causing restricted fluid flow through the orifice in proportion to the position of the sensing member 15.

Since the sensing member 15 is pivoted to one side of its center of gravity, it is necessary to provide a biasing gravity spring 20 for maintaining the sensing member in an initial selected position capable of movements above and below this position. The gravity spring 20 is positioned within an opening 21 in a suitable unit frame member or body 22 of the unit 4, with the opening 21 positioned to open into a space 23 falling within an enclosure shell 24 around the sensing member 15. The opening 21 is provided with a piston 25 of sufficient length to be received within the opening 21 and guided to a position in which one end engages the sensing member at a position on the opposite side of its pivot from the arm 17. The piston 25 is biased upwardly against the sensing member 15 by the gravity spring 20.

The orifice 18 is provided with fluid flow under relatively high pressure which is expelled into space 23 an area within the cover element 24 positioned about the sensing member 15. Fluid flow from the valve opening 18 is first expelled into a suitable chamber 26 provided with a fluid return pipe 27 eventually connected to the return pipe 11 and to the reservoir 13. The chamber 26, however, is also provided with an opening 28 capable of receiving the valve 19.

Fluid leakage from the chamber 26 past the slide fit of the valve 19 into the space 23, together with other leakages, fills the space 23. Damping of the member 15 is provided by the piston 25 which is provided with a passage 29 interconnecting the space 23 with the region beneath the gravity piston 25 containing the gravity spring 20. The opening of the passage 29 into the space or chamber 23 is provided with a bimetallic orifice restriction damper member 30 anchored at one end to the frame member 22 with its remaining end positioned over the end of the passage 29. The bimetallic damper is secured in such a manner as to provide a greater restriction of fluid movement into and out of the passage 29 during high temperature periods, thus maintaining the damping action substantially constant with changes of temperature. During low temperature periods, the bimetallic strip 30 bows upwards to provide a greater freedom of fluid movement into and out of the passage 29.

In order to maintain proper balance of the sensing element, it is additionally necessary to provide a compensating piston 31 positioned within an opening 32 in the frame member 22 for engagement with the sensing member 15 at a point to the side of the pivot spring 16 opposite to the arm 17. The compensating piston 31 is provided with a passage and filter screen 33 connecting to the pilot supply passage 6 for the purpose of providing a change in bias on the sensing member 15 in response to changes in pilot supply line liquid pressure and thus in accumulator pressure. The purpose of the compensating piston 31 is to maintain a torque balance of the sensing element during accumulator pressure changes. In order to provide a velocity action on the sensing member 15, a feed-back piston 34 positioned in an opening 35 within the frame member 22 for engagement with the arm 17 is provided. The feed-back piston 34 being at the left of pivot spring 16 causes a rotational motion of the sensing member about the pivot spring 16 in a clockwise direction, which is opposite in action to the gravity spring and to the force of the compensating piston, which elements provide counterclockwise motion of the inertia sensing member 15 with respect to pivot spring 16. The opening 35 holding the feed-back piston 34 is connected through a filter 33' and pipe 36 to one side, as shown, the lower side of the chamber in the actuator 7 through suitable passages to be explained hereinafter.

The unit 4 in addition to housing the sensing member 15 also houses the control valves for the work actuator or power shock absorber 7. The two main power valves for control of the work actuator comprise a supply valve 37 and the exhaust valve 38. The supply 37 is a poppet type valve provided with a fluid flow control portion 39 utilized to connect the fluid supply pipe 5 to the fluid output control pipe 40 connected to the work actuator chamber 41 formed by a cylinder housing 42 and a piston 43 in the work actuator 7. The fluid control portion 39 of the valve 37 is provided with a valve seat portion 44 integral with the frame member 22 of the unit 4 with the valve seat portion forming an opening between the chamber 45 connected to the supply pipe 5 and the control supply pipe 40 leading to the work actuator 7. The fluid control portion 39 of the supply valve 37 is provided with a reduced area actuating stem 46 provided with a shoulder 47 capable of receiving a suitable bias spring 48 positioned between the shoulder 47 and the valve seat 44. The bias spring 48 normally serves to seat the valve control portion 39 against the valve seat 44. The actuating stem 46 of the valve 37 passes through a bearing 49 into a pilot pressure control chamber 50. The chamber 50 is supplied with pressure from the main accumulator 3 through the pilot supply pipe 6. The stem 46 has secured to its left end within the chamber 50 a suitable control piston 51 utilized to actuate the fluid control portion 39 between open and closed positions with respect to the valve seat 44.

The chamber 50 is divided into two portions 52 and 53 by the piston 51 with the chamber portion 52 being supplied with main accumulator fluid pressure at all times. The chamber portion 52 is also provided with an outlet passage 54 for providing fluid flow to one chamber of the exhaust valve 38 to be explained hereinafter and to an orifice 55 providing restricted flow and pressure drop for the passage 56 leading to the pilot valve orifice 18 and to the orifice 57 interconnecting the chamber portion 53 of the supply valve 37 to the pilot pipe 56 and to the orifice 70 interconnecting the chamber portion 67 of the exhaust valve 38 to the pilot pipe 56. An explanation of the operation of this valve will be presented in connection with the operation of the system.

The previously described supply valve provides fluid under pressure for the chamber 41 of the work actuator 7. Fluid delivered under pressure to the chamber 41 causes the piston 43 to move downwardly as viewed in the drawings, resulting in an expansion of the chamber 41. Under certain other conditions such as during a rise in the road surface the piston 43 is forced upwardly against the fluid within the chamber 41. An acceleration force is also applied to the sensing member 15 resulting in an opening of the discharge valve 38 and expulsion of the fluid from the chamber 41 past the discharge or exhaust valve 38 and into the fluid return line 11.

The exhaust valve 38 is provided with a fixed valve seat 58 and a cooperating valve closure member 59 having secured thereto at the opposite end thereof an actuating piston 60. The valve seat is provided with a passage 61 through the center thereof and with a number of annularly disposed hole passages 62 opening between the fluid passage 40 and a return pressure chamber 63 housing the valve closure portion 59. The return chamber 63 is connected to the return pipe 11 for fluid return to the reservoir 13. The annularly spaced hole openings 62 are provided with a closure ring 64 biased against the valve seat 58 and a portion of the frame 22 by a bias spring 65. The purpose of the annularly spaced hole openings and normally closed ring is to allow, under certain severe conditions, the reverse passage of fluid during periods to be explained hereinafter. The reverse movement of fluid is from the return pipe into the shock absorber control supply pipe 40.

The valve closure portion 59 is a cylindrically shaped member extending through a bearing 66 in the frame member 22 into a chamber 67 formed within the frame member 22. The chamber 67 is divided into two portions 68 and 69 by the piston 60 of the exhaust valve 38. The chamber portion 69 is connected to the main pilot supply pressure pipe 54 to provide main supply pressure forces on the piston 60 in a direction to attempt to open the exhaust valve 38. The chamber portion 68 is connected through the orifice 70 to the pilot control pipe 56 and is provided with pilot control pressure applied to the piston 60 to act to force the exhaust valve 38 to be seated or closed. Under normal static conditions, that is, no change in the position of the piston 43 due to road imperfections, the force of the pilot pressure on one end of the piston 60 is exactly matched by the main accumulator pressure applied to the opposite end of the piston over a reduced area and the pressure of fluid in cylinder 41 acting on valve area 59. The exhaust valve 38 therefore is maintained in a closed position and basically or substantially a zero biased condition.

Through the sensing of accelerations by the sensing member 15, fluid is supplied or relieved from the chamber 41 of the work actuator 7 to suit the immediate demands of force upon the sprung mass upon which the unit 4 is secured. In order to provide fluid to the opposite side of the piston 43 within the cylinder 42 which forms a chamber 71, a fluid pipe 72 is provided connecting the chamber portion 71 to the high pressure fluid pipe 5 through a pair of damper valves 73 and 74. The damper valve 73 is biased to closed position by a suitable spring such as the spring 75 and under static conditions is maintained closed by the spring 75 with the chamber 71 pressure on one side thereof and accumulator pressure on the other side thereof. The damper valves 73 and 74 are provided with small orifices 76 and 77, respectively. Without the orifices 76 and 77 the rate of fluid transfer past the damper valves is slow in the beginning of a difference of pressure and increases as the pressure rises. The action of the orifices is to provide an opposite action with a rapid increase of flow at the beginning and a smaller increase of flow as the pressure rises. The two actions combined thus result in a more nearly straight line response curve for the damper valves 73 and 74.

The damper valve 73 responds to motion of the piston 43 upwardly as viewed in the drawings allowing fluid to flow from the main supply pipe 5 through the pipe 72 into the lower chamber 71. The damper valve 74 is oppositely positioned with respect to the damper valve 73 and biased to a closed position by a suitable bias spring 78. The damper valve 74 is positioned to respond to a motion of the piston 43 downwardly, as viewed in the drawings, causing a reduction in volume of the chamber 71 and the flow of fluid through the pipe 72 past the damper valve 74 and into the main accumulator supply pipe 5.

In order to maintain a minimum pressure ratio between the pressure within the chamber 71 and the supply fluid in pipe 5, a ratio valve 79 is provided. The valve 79 is provided with a poppet type valve closure member 80 moved to a seated position against the valve seat 81 in the frame member 22 through the use of a piston 82 connected to the poppet valve closure member 80 through a stem 83. The piston 82 is provided with its full surface on one end thereof exposed to the fluid return pressure in pipe 11 through a connecting pipe 84 presenting little or no forces on the piston 82. The opposite end of the piston 82 is exposed to the main accumulator pressure from pipe 5 through the connection of the pipe 85 between the main supply pipe 5 and the area between the piston 82 and the closure member 80 of the ratio valve 79. The closure member 80 is also exposed to fluid pressure within the cavity 71 and pipe 72. The force of the pressure on the closure member 80 is sufficient to maintain the ratio valve closed as long as the ratio between the pressure in the chamber 71 and the pressure in the fluid supply pipe 85 is maintained.

A time when the ratio may not be maintained exists when through sudden motion of the piston 43 upwardly as viewed in the drawings causing the flow of fluid through the damper valve 73. If the motion is sufficiently rapid the damper valve 73 is inadequate to supply the demand of expanding chamber 71. When this condition exists cavitation occurs unless some means is provided for supplying the necessary fluid pressure within the chamber 71. The ratio valve provides this additional fluid by the chamber 71 pressure decreasing and acting to allow the high pressure in pipe 85 to open the ratio valve 79 to allow high pressure fluid from the main accumulator 3 to flow through the pipe 72 into the cavity 71. This action takes place since the area of the closure member 80 exposed to the pressure in fluid supply pipe 85 is greater than the area of the piston 82 exposed to the same pressure. When the pressure buildup within chamber 71 is back to the selected level above that established for the ratio valve 79, the ratio valve again becomes seated and fluid passage is maintained through the damper valves only.

In addition to the ratio valve 79 there is provided an inlet valve 86 having a valve closure member 87 normally seated against its valve seat 88 by a suitable bias spring 89. The inlet valve 86 is arranged to allow fluid flow only in the direction from the fluid return line 11 to the line 72 feeding the lower cavity 71 of the work actuator 7. This valve is provided for preventing cavitation within the chamber 71 during periods of pump failure. When the piston 43 is being driven upwardly as viewed in the drawings to demand an increase in fluid flow into the chamber 71 fluid is available only from the reservoir 13. However, the inlet valve 86, connected directly to the fluid return line 11, is forced open by the reduction of pressure in the line 72 causing fluid flow from the return line 11 into the chamber 71.

Operation of the modification just described will now be explained under normal operating conditions. If we assume that the unit 4 is mounted on the sprung mass A along with the main accumulator, pump and reservoir with the actuating cylinder 42 of the work actuator 7 also secured to the sprung mass and the piston 43 connected to the unsprung mass B through the piston rod 90 and bearing 91, the following operation would take place. If we assume that the vehicle is passing over a road-bed with the undercarriage or unsprung mass B momentarily encountering a rise in the road-bed, it should be clear that a force would be delivered through the springs and shock absorber to the sprung mass A in a direction upwardly as viewed in the drawings. This acceleration would in turn cause the sensing member 15 to rotate clockwise about its leaf spring 16 resulting in a greater opening of the valve 19 and consequently a reduction in pressure in the pipe 56 and in the chambers 53 and 68. A reduction in pressure in the chamber 53 causes the inlet valve 37 to be more firmly seated or closed. The reduction in pressure within the chamber 68, however, causes an opening of the closure member 59 with respect to the seat 58 resulting in fluid being discharged from the chamber 41 of the work actuator 7 through the exhaust valve 38 and into the return line 11 to the reservoir 13. Since the pressure within the chamber 41 is normally at a pressure well above the return fluid pressure within the pipe 11, the rapid exhaust of fluid through the exhaust valve 38 actually results in an upward movement of the piston 43 over and above the forces being applied to it by the unsprung mass or undercarriage B since the pressure in chamber 71 and pipe 72 is now greater than the reduced pressure in chamber 41 and pipe 40. Since the piston 43 is moving upwardly, an increase in the size of the chamber 71 occurs. The increase in the chamber 71 results in a decrease of pressure within the chamber 71 which in turn results in an opening of the damper valve 73 to provide fluid from the main source pipe 5 to the lower chamber 71. As long as the motion of the piston 43 is not sufficiently fast to cause the reduction in pressure in the chamber 71 to be above a value preestablished by the relative areas of the ratio valve 79 and the rate of flow through the damper valve 73, the ratio valve will remain closed. However, if this pressure drop within the chamber 71 due to piston movement exceeds the ratio established by the ratio valve 79, fluid pressures between the pressure line 85 and the chamber 71 will cause the ratio valve 79 to open to admit fluid from the supply pipe 5 to the chamber 71 for normal pressure buildup in the chamber 71. A return of proper pressure ratio between the return line and the chamber 71 will again cause the ratio valve to be seated.

If we now take the condition of the undercarriage or unsprung mass B entering a depression in the road-bed, it should be obvious that the sprung mass would receive an initial downward acceleration resulting in movement of the sensing member counterclockwise about its pivotal spring 16. Counterclockwise movement of the sensing member 15 results in a restriction of the valve opening 18 and a build-up of pressure within the pipe 56. The build-up of pressure within the pipe 56 causes an increase in pressure within the chambers 53 and 68 of the intake and exhaust valves, respectively. The increase in pressure within the chamber 53 of the supply valve results in the piston 51 and closure member 39 being displaced to the right as viewed in the drawings causing the closure member 39 to admit fluid from the fluid supply pipe 5 into the chamber 41 of the work actuator 7. At the same time the increase of pressure within the chamber 68 of the associated valve 38 results in this valve being more firmly seated to prevent the exhaust of fluid from the chamber 41. The result is that expansion of the chamber 41 and movement of the piston 43 downwardly take place. Movement of the piston 43 downwardly results in fluid exhaust from the chamber 71 outwardly through the damper valve 74 and into the pressure supply pipe 5. Under normal operating conditions, no cavitation of the chamber 41 can occur, since the pressure of the supply line 5 is capable of delivering fluid to the chamber 41 at any desired rate. However, during periods of pressure or pump failure when fluid cannot be supplied through the intake valve from the main supply line 5, the inlet valve 64 associated with the exhaust valve 38 will open when the pressure in the chamber 41 falls below the return fluid pressure level. This allows return fluid pressure to be drawn into the chamber 41 preventing cavitation. Under power pump failure, operation of the actuator would be approximately the same as any passive type shock absorber.

In order to prevent any accumulator pressure changes from affecting the action of the power actuator 7, the compensating piston 31 is provided in order to always maintain proper sensing element control pressure ratio with respect to the main accumulator pressure. In addition, the feed-back piston 34 connected through the pipe 36 to the pipe 72 and chamber 71 results in a negative feed-back pressure to the sensing member during all operations of the sensing member 15. For example, if the sensing member is being accelerated by a rise in the road surface resulting in an exhaust of fluid from the chamber 41 and a reduction of pressure within the chamber 71 being dictated by a clockwise movement of the sensing member 15, the feed-back piston 34 is at the same time reducing its forces on the arm 17 resulting in a little less clockwise force on the sensing member 15. Under the other condition where the unsprung mass encounters a depression in the road surface, the piston 43 is placed under motion downwardly, as viewed in the drawings, resulting in a motion of the sensing mass in a counterclockwise direction. A counterclockwise rotation of the sensing mass results in an opening of the supply valve providing an increase in pressure and expansion of the chamber 41 which in turn compresses the chamber 71 resulting in an increase of pressure within the chamber 71. The increase of pressure in the chamber 71 is felt in the pipes 72 and 36 resulting in an increase in the force of the piston 34 against the arm 17 providing a clockwise motion or force against the member 15, which is directly opposite to the initial sensing member movement. The piston 34 provides the velocity feedback stabilization for the sensing element.

An additional damping action is provided throughout all operations by the gravity piston 25 being biased by the bias spring 20 and damped by fluid passage past the bimetallic member 30. As previously pointed out, movement of fluid into and out of the passage 29 is opposed by the bimetallic damper spring 30. The bimetallic member spacing with respect to the pipe 29 is directly proportional to the temperature of the fluid within the space 23. As previously pointed out, the bimetallic member allows greater passage 29 opening during cool oil temperatures in which high viscosity occurs. The bimetallic strip also restricts the opening of the pipe 29 during high temperature periods when the viscosity of the oil is low.

Figure 3:
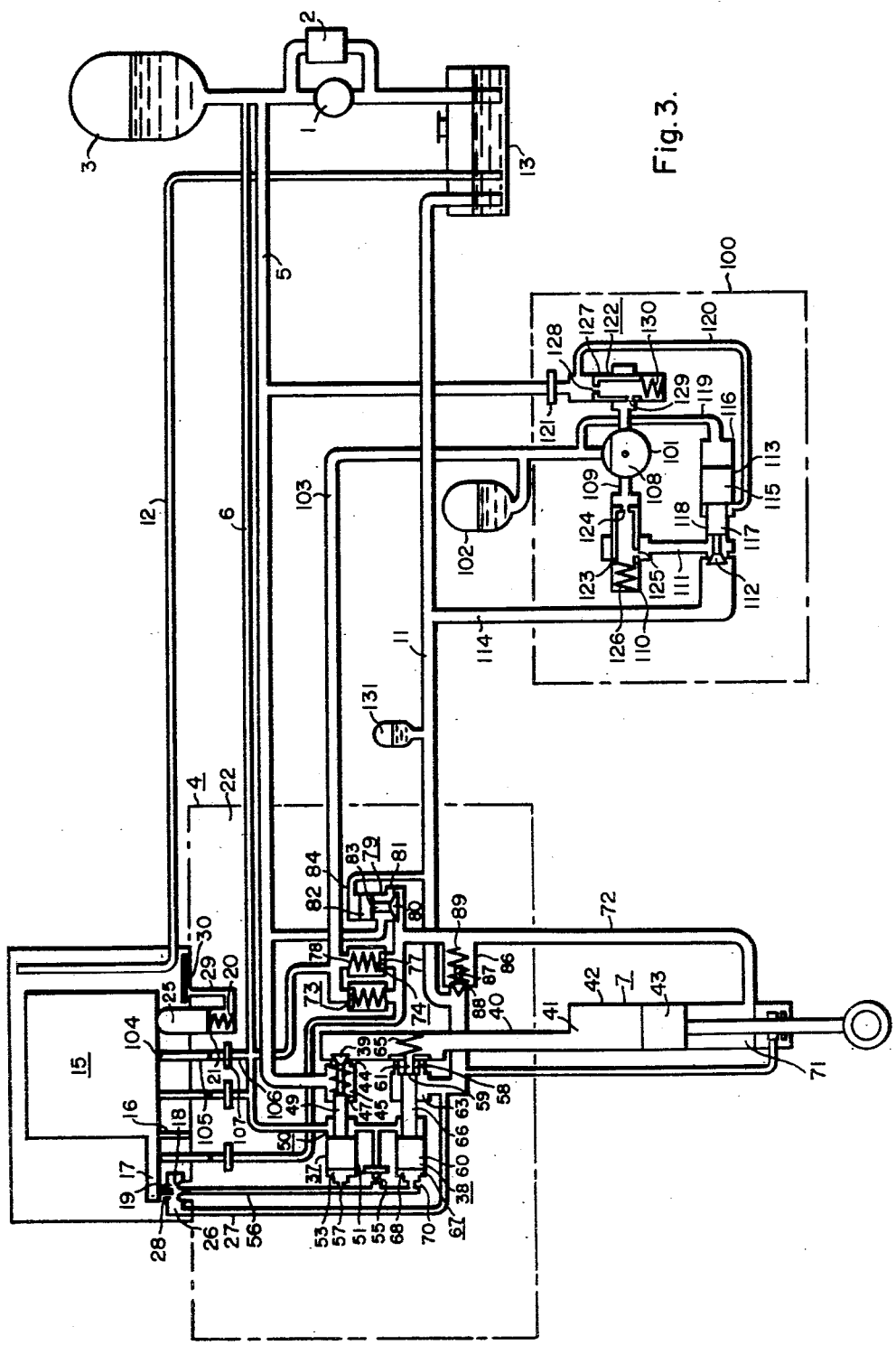
FIG. 3 is a diagrammatic showing of another embodiment of the invention shown in the control of a single stabilizing element or actuator.

In addition to the improved shock absorber action of the embodiment of FIG. 2, the embodiment of FIG. 3 adds the provision of body leveling of the vehicle due to changing loads. This leveling control arrangement is an improvement over the structure shown in my application S.N. 630,835, filed December 27, 1956, in that little or no change in the over-all range of dynamic control will occur with the present leveling system as compared to the restriction with control of the leveling system disclosed in the application S.N. 630,835.

In order to provide the unrestricted dynamic control while at the same time maintaining leveling control, there is provided a leveling actuator 100 provided with a leveling valve 101 for selecting fluid flow to a second pressure system including the accumulator 102 from the supply pipe 5 of the main supply system.

In order to understand the function of the leveling valve 101 a brief description of the association of the second leveling pressure system of the accumulator 102 with respect to the work actuator 7 will now be made. The pressure of the accumulator 102 in the leveling supply system is delivered through an auxiliary supply pipe 103 to the damper valves 73 and 74. The damper valves 73 and 74 are now supplied with pressure from a second pressure reference, the leveling supply accumulator 102, rather than from the main supply as in the previous embodiment. It can be seen therefore that by varying the reference pressure in the accumulator 102 the pressure within the pipe 72 and chamber 71 of the work actuator 7 can be varied. Variation within the chamber 71 results in a displacement of the piston 43 upwardly upon an increase in pressure and downwardly in response to a decrease in pressure. This results in a repositioning of the cylinder 42 with respect to the piston 43 and thus a relative repositioning of the sprung and unsprung masses A and B. Since the action of the pressure change in the chamber 71 in response to leveling action is a result of the change of pressure within the accumulator 102 and pipe 103, and since the average pressure of chamber 71 affects the bias of feed-back piston 34, it is necessary to provide a compensating feed-back piston 104 positioned to engage the sensing element 15 on the side of the element opposite to the arm 17 to provide for sensing mass adjustment to the change in pressure. The compensating piston 104 is positioned within an opening 105 in the frame member 22 of the unit 4 and is connected to the pipe 103 for pressure sensing through the pipe 106 having a filter 107 therein. In order to provide a clear showing, the pistons 31, 34, 104 and valve member 19 are not shown in their actual positions or comparative sizes. The combined torques, however, result in a complete balance under normal static conditions.

In order to provide leveling pressure within the pipe 103 and accumulator 102, a rotary leveling valve 101 is provided which is secured (as shown in FIG. 1) to the sprung mass A and connected to the unsprung mass B through the link 107' for rotation of the rotary member 108. The rotary member 108 when in its neutral position prevents the transfer of fluid to the accumulator 102 from the main pressure supply 5, and from the accumulator 102 to the return pipe 11 and reservoir 13. The construction of the valve movable member 108 is such that a displacement of the body or sprung mass with respect to the unsprung mass, a reasonable distance such as for example ¼ inch, above or below a neutral position will not result in the transfer of fluid to or from the accumulator 102. If we assume, however, that an additional load is added to the body or sprung mass A, it can be seen that a rotation of the valve member 108 counterclockwise as viewed in the drawings will take place. Counterclockwise rotation of the valve member 108 past the ¼ inch limitation provides for passage of fluid from the accumulator system 102 out through the passageway 109 and through the constant velocity valve 110 into the outgoing pipe 111 past the closure member 112 of the ratio valve 113, which is normally in its open position, into the return passage 114 which is in turn connected to the return passage 11. A reduction in the reference pressure within the accumulator 102 in turn causes a reduction in pressure within the pipes 103 and 72 and the chamber 71. The reduction in pressure within the chamber 71 also results in a greater pressure difference between the chamber 41 and the chamber 71 causing the piston 43 to be displaced downwardly with respect to its cylinder 42 resulting in a lifting of the cylinder 42 and the sprung mass A.

The ratio valve provided herein is for the purpose of maintaining a minimum pressure ratio between pressure in the level accumulator 102 and the pressure in the main accumulator 3, if the load being added to the vehicle sprung mass A is greater than the maximum leveling force available in the shock absorber system. If the pressure ratio between the accumulator 102 and accumulator 3 exceeds the minimum value a displacement of the closure member 112 of the ratio valve 113 to the right as viewed in the drawings, takes place preventing any further expulsion of fluid from the chamber 102 to the fluid return pipe 114.

The ratio valve 113 is provided with a piston 115 positioned within the cylinder 116 and the valve body 100. The piston 115 is connected to the closure member 112 through the reduced area shaft 117. The reduced area shaft 117 is provided with a guiding bushing 118 separating the pressure zone of the closure member 112 from the area of the piston 115. The end of the piston 115 opposite to the closure member 112 is subjected to accumulator 102 pressure through the pipe 119. The opposite end of the piston 115 is subjected to main accumulator 3 pressure through the pipe 120 connecting the cylinder 116 to the main accumulator supply pipe 5 through a suitable filter 121. The action of the main accumulator pressure on the piston 115 is over a reduced area of the piston 115 resulting in a greater total force on the piston 115 by the pressure of the leveling accumulator 102 than the force introduced by the main accumulator 3 on the piston 115. This action results in a displacement with the closure member 112 to the left as viewed in the drawings to be normally maintained open.

If we now assume that a load is removed from the vehicle causing the sprung mass to move to a level above the desired level with respect to the unsprung mass, a clockwise rotation of the valve member 108 will take place. Clockwise rotation of the valve member 108 results in the interconnection of the main accumulator supply line 5 to the leveling accumulator supply line causing fluid to be delivered from the main accumulator to the leveling accumulator through a constant velocity flow valve 122, the purpose of which will be explained hereinafter. The increase of pressure within the leveling accumulator 102 then results in fluid flow from the pipe 103 past the damper valve 73 into the pipe 72 and chamber 71 of the work actuator 7. This results in a displacement of the piston 43 upwardly as viewed in the drawings, with respect to the cylinder 42. With the cylinder 42 secured to the sprung mass A a displacement of the sprung mass downwardly with respect to the unsprung mass results. Movement of the sprung mass downwardly with respect to unsprung mass results in a counterclockwise rotation of the valve member 108 until fluid flow from the main accumulator to the leveling accumulator is cut off. At this time the vehicle is again adjusted to the proper attitude.

With the system thus far described, it should be clear that leveling action would take place in response to road imperfections encountered by the unsprung mass during the traversing of a road-bed. In order to prevent this undesirable action a pair of velocity flow valves 110 and 122 are provided. The velocity flow valves 110 and 122 additionally provide for equal transfer of fluid between the main and leveling accumulators at all times in response to road imperfections regardless of the relative pressures of the two accumulators. The velocity flow valve 110 is provided with a piston 123 having an orifice 124 in the end thereof. The piston 123 is also provided with an output metering port 125 in its skirt and a bias spring 126 capable of biasing the output port 125 into register with an output passage 111. With a velocity flow device of this nature and with the valve 108 displaced counterclockwise with respect to neutral position due to a road imperfection of relatively short duration, fluid flow from the leveling accumulator through the orifice 124 in the flow rate valve 110 would cause a slight reduction in pressure on the spring 126 side of the piston 123. The reduction in pressure causes an unbalance of forces on the piston causing it to be displaced toward the spring 126. This action causes the piston to reduce or cut off fluid flow from the accumulator 102 to the return line 114. When road imperfections dictate movement of the valve 108 in the other direction an identical flow rate is provided by the valve 122 allowing fluid transfer from the accumulator 3 to the accumulator 102 at the same rate thus maintaining the same relative leveling accumulator 102 pressure. The fact that the pressure difference between the accumulator 102 and the accumulator 3 may be greater or less than the pressure difference between the accumulator 102 and the return line 114 would not affect the amounts of fluid allowed to be transferred by the valves 110 and 122. Since road imperfections would average out to be equal in bumps and hollows the velocity valves would cause the leveling accumulator 102 to maintain its pressure at the selected pressure level. If a load is added to or removed from the sprung mass the valve 108 becomes displaced in one direction for a longer time than when displaced by road imperfections and remains displaced until the velocity flow valve affected allows sufficient fluid passage to relevel the vehicle sprung mass. The velocity flow valve action under this condition is such that when the flow is cut-off by the velocity valve due to too great a demand, the pressure difference on the piston becomes equalized allowing the piston bias spring to reopen the side cut-off port in the piston wall. This action occurs until the sprung mass is repositioned. From the foregoing it is seen that the reference level provided by the accumulator 102 is recalibrated by the leveling actuator 100 in response to a change in load.

In order to prevent liquid hammering due to surges of flow in the return line, a small surge accumulator 131 connected to the flow return line 11 is provided. The action of the surge accumulator 131 is to prevent rapid changes of pressure in the line 11.

The description of the two embodiments of a single sensing control member made hereinbefore is for one power actuator typical of those positioned adjacent each wheel of the vehicle. The action of the vehicle with all four sensing members in place and properly positioned on the vehicle is one capable of providing banking of the vehicle toward the center of any turn encountered by the vehicle. This action is explained in detail within the previously mentioned application Serial No. 630,835. It is felt that it is unnecessary to go into a complete operation description of the different inertia members when mounted adjacent to all four wheels of the vehicle such as described in the application Serial No. 630,835.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a power shock absorber and leveling system for a vehicle having sprung and unsprung masses, hydraulic actuator means connected between said sprung and unsprung masses, said hydraulic actuator means having a piston and two fluid chambers on opposite sides of the piston, inertia controlled valve means for determining the pressure in one only of said fluid chambers, and valve means connected to respond to the spacing between said masses for determining the pressure in the other only of said fluid chambers.

2. In a power shock absorber and leveling system for a vehicle having relatively movable sprung and unsprung masses, hydraulic actuator means connected between said sprung and unsprung masses, said hydraulic actuator means having a piston and two fluid chambers on opposite sides of the piston, inertia controlled valve means for determining the pressure in one only of said fluid chambers, and valve means connected to respond to the spacing between said masses for determining the pressure in the other only of said fluid chambers, means for providing a first fluid pressure reference for said one fluid chamber, and means for providing a second fluid pressure reference for said other fluid chamber.

3. In a power shock absorber and leveling system for a vehicle having sprung and unsprung masses, hydraulic actuator means connected between said sprung and unsprung masses, said hydraulic actuator means having two fluid chambers, inertia controlled valve means for determining the pressure in one of said fluid chambers, and valve means connected to respond to the spacing between said masses for determining the pressure in the other of said fluid chambers, means for providing a first fluid pressure reference for said one fluid chamber, and means for providing a second fluid pressure reference for said other fluid chamber, and pressure ratio means for maintaining a minimum pressure ratio between said second and first pressure references.

4. In a power shock absorber and leveling system for a vehicle having sprung and unsprung masses, hydraulic actuator means connected between said sprung and unsprung masses, said hydraulic actuator means having two fluid chambers, inertia controlled valve means for determining the pressure in one of said fluid chambers, and second valve means connected to respond to the spacing between said masses for determining the pressure in the other of said fluid chambers, first reference means for providing a first fluid pressure reference for said one fluid chamber, and second reference means for providing a second fluid pressure reference for said other fluid chamber, said first and second reference means comprising a pair of accumulators, a fluid supply, a velocity-flow control means, one of said accumulators being directly connected to said fluid supply, the other of said accumulators being connected to said fluid supply through said second valve means and said velocity flow control means.

5. In a power shock absorber and leveling system for a vehicle having sprung and unsprung masses, hydraulic actuator means connected between said sprung and unsprung masses, said hydraulic actuator means having a piston and two fluid chambers on opposite sides of the piston, inertia controlled valve means for determining the pressure in one of said fluid chambers, valve means connected to respond to the spacing between said masses for determining the pressure in the other of said fluid chambers, and response control means for preventing substantial pressure changes in said other chamber in response to rapid valve means displacements of short duration of said valve means responsive to spacing.

6. In a power shock absorber and leveling system for a vehicle having relatively movable sprung and unsprung masses, hydraulic actuator means connected between said sprung and unsprung masses, said hydraulic actuator means having two fluid chambers, inertia controlled valve means for determining the pressure in one of said fluid chambers, and valve means connected to respond to the spacing between said masses for determining the pressure in the other of said fluid chambers, and response control means for preventing pressure changes in said other chamber in response to rapid valve means displacement, said response control means comprising a fluid velocity responsive valve for preventing rapid fluid flow.

7. In a power shock absorber system for a vehicle having sprung and unsprung masses, hydraulic actuator means connected between said masses, said hydraulic actuator means comprising a cylinder having a piston therein forming two chambers of different cross section, inertia controlled valve means for determining the pressure in only that chamber having the larger cross section, and valve means responding to the spacing between said masses for determining the pressure in only that chamber having the smaller cross section.

8. In a power shock absorber and leveling system for a vehicle having relatively movable sprung and unsprung masses, hydraulic actuator means connected between said sprung and unsprung masses, said hydraulic actuator means having two fluid chambers, inertia controlled valve means for determining the pressure in one of said fluid chambers, and valve means connected to respond to the spacing between said masses for determining the pressure in the other of said fluid chambers, a first fluid pressure reference for said one fluid chamber, a second fluid pressure reference for said other fluid chamber, a fluid reservoir, an emergency inlet valve connected between said other chamber and said reservoir for preventing cavitation in said other chamber during rapid chamber expansion.

9. In a power shock absorber system for a vehicle having relatively moving masses, hydraulic actuator means connected between said masses, said hydraulic actuator means comprising a cylinder having a piston therein forming two chambers, inertia controlled valve system means for determining the pressure in one of said chambers, said inertia controlled valve means having supply and exhaust valves for controlling said one chamber, a movable sensing mass pivoted at a point remote to its center of gravity, and a pilot control system operated by said sensing mass and connected to said supply and exhaust valves to provide variable control pressures for said supply and exhaust valves in response to the pivotal movement of said sensing mass.

10. In a power shock absorber system for a vehicle having relatively moving masses, hydraulic actuator means connected between said masses, said hydraulic actuator means comprising a cylinder having a piston therein forming two chambers, inertia controlled valve system means for determining the pressure in one of said chambers, said inertia controlled valve means having supply and exhaust valves for controlling said one chamber, a sensing mass pivoted at a point remote to its center of gravity, and a pilot system controlled by said sensing mass and connected to said supply and exhaust valves to provide variable control pressures for said supply and exhaust valves in response to the pivotal movement of said sensing mass, said pilot control system being a separate fluid system from said inertia controlled valve system means to provide pilot system stability.

11. In a power shock absorber system for a vehicle having relatively moving masses, hydraulic actuator means connected between said masses, said hydraulic actuator means comprising a cylinder having a piston therein forming two chambers, inertia controlled valve system means for determining the pressure in one of said chambers, said inertia controlled valve means having supply and exhaust valves for controlling said one chamber, a movable sensing mass pivoted at a point remote to its center of gravity, and a pilot system controlled by said sensing mass and connected to said supply and exhaust valves to provide variable control pressures for said supply and exhaust valves in response to the pivotal movement of said sensing mass, and fluid damping for said sensing mass, said fluid damping comprising a temperature varied orifice, said orifice opening varying in opposition to the temperature.

12. In a fluid control vehicle leveling device, which controls fluid flow to a piston for effecting a desired vehicle level, means for preventing movement of said piston in response to rapid control variations of said device, the latter means comprising a velocity control valve comprising a cylinder having a free piston, said free piston having a skirt and a face, said face having a metering orifice therein, a spring for biasing said free piston toward one end of said cylinder, an outlet port in said cylinder positioned in said cylinder to be uncovered by said piston skirt, said piston being displaced against said bias spring to a position of fluid cutoff covering said outlet port upon a fluid flow demand greater than allowed by said piston orifice.

13. In a power shock absorber and leveling system for a vehicle having sprung and unsprung masses, hydraulic actuator means connected between said sprung and unsprung masses, said hydraulic actuator means having two fluid chambers, inertia controlled valve means for determining the pressure in one of said fluid chambers, and valve means connected to respond to the spacing between said masses for determining the pressure in the other of said fluid chambers, means for providing a first fluid pressure reference for said one fluid chamber, means for providing a second fluid pressure reference for said other fluid chamber, said inertia controlled valve means comprising a pivotal sensing mass and biasing means responsive to said first and second fluid pressure references for maintaining said mass pivotal position independent of variations of said first and second fluid pressure references.

14. In a power shock absorber system for a vehicle having relatively moving masses, hydraulic actuator means connected between said masses, said hydraulic actuator means comprising a cylinder having a piston therein forming two chambers, inertia controlled valve system means for determining the pressure in one of said chambers, said inertia controlled valve means having supply and exhaust valves for controlling said one chamber, a sensing mass pivoted at a point remote to its center of gravity, and a pilot system controlled by said sensing mass and connected to said supply and exhaust valves to provide variable control pressures for said supply and exhaust valves in response to the pivotal movement of said sensing mass, and fluid damping for said sensing mass, said fluid damping comprising a temperature varied orifice, said orifice opening varying in opposition to the temperature, said supply valve having a control piston that is pressure isolated from said inertia controlled valve system pressures and affected by only said pilot system pressures.

15. In a power shock absorber and leveling system for a vehicle having sprung and unsprung masses, hydraulic actuator means connected between said sprung and unsprung masses, said hydraulic actuator means having two fluid chambers, inertia controlled valve means for determining the pressure in one of said fluid chambers, valve means connected to respond to the spacing between said masses for determining the pressure in the other of said fluid chambers, a fluid reservoir, a first fluid supply for supplying fluid for said other of said fluid chambers, a main fluid supply for supplying fluid for said one fluid chamber and said first fluid supply, and fluid velocity responsive means connected between said main fluid supply and said first fluid supply and between said first fluid supply and said fluid reservoir for providing equal fluid transfer to and from said main supply and said first supply and to and from said first supply and said reservoir regardless of the relative pressures involved.

References Cited in the file of this patent

UNITED STATES PATENTS

| | | |
|---|---|---|
| 2,441,220 | Dixon | May 11, 1948 |
| 2,584,418 | Branson | Feb. 15, 1952 |
| 2,593,040 | Lloyd | Apr. 15, 1952 |
| 2,650,108 | Bruce | Aug. 25, 1953 |
| 2,855,214 | Boulet | Oct. 7, 1958 |
| 2,860,889 | Hanna | Nov. 18, 1958 |
| 2,913,004 | Norton | Nov. 17, 1959 |
| 2,922,634 | Shedd | Jan. 26, 1960 |